United States Patent [19]
Jolly et al.

[11] Patent Number: 6,131,709
[45] Date of Patent: Oct. 17, 2000

[54] ADJUSTABLE VALVE AND VIBRATION DAMPER UTILIZING SAME

[75] Inventors: Mark R. Jolly, Holly Springs; J. David Carlson, Cary, both of N.C.; Donald R. Prindle, North East, Pa.

[73] Assignee: Lord Corporation, Cary, N.C.

[21] Appl. No.: 08/978,337

[22] Filed: Nov. 25, 1997

[51] Int. Cl.[7] ...................................................... F16F 9/53
[52] U.S. Cl. ................... 188/267.2; 60/326; 188/267; 188/322.15; 188/322.22; 137/909; 267/64.15
[58] Field of Search ............................... 188/267.1, 267.2, 188/266.1, 267, 314–315, 322.15, 322.22, 298, 266.2, 282.2, 282.3, 282.4, 317, 319.1, 319.2, 299.1, 269; 192/21.5; 267/140.14, 140.15, 219, 221, 64.15; 137/909, 807, 827, 251.1; 60/326; 280/5.515

[56] References Cited

U.S. PATENT DOCUMENTS

| | | | |
|---|---|---|---|
| 2,661,596 | 12/1953 | Winslow | 60/52 |
| 2,667,237 | 1/1954 | Rabinow | 188/88 |
| 3,059,915 | 10/1962 | Kemelhor | 267/1 |
| 3,420,341 | 1/1969 | Keehn | 188/88 |
| 3,807,678 | 4/1974 | Karnopp et al. | 248/358 R |
| 4,582,343 | 4/1986 | Waugh | 280/284 |
| 4,819,772 | 4/1989 | Rubal | 188/267.1 |
| 4,856,631 | 8/1989 | Okamoto et al. | 192/21.5 |
| 4,887,699 | 12/1989 | Ivers et al. | 188/378 |
| 5,078,241 | 1/1992 | Ackermann et al. | 188/299 |
| 5,080,392 | 1/1992 | Bazergui | 280/707 |
| 5,190,073 | 3/1993 | Vogt | 137/909 |
| 5,277,281 | 1/1994 | Carlson et al. | 188/267 |
| 5,284,330 | 2/1994 | Carlson et al. | 267/140.14 |
| 5,398,917 | 3/1995 | Carlson et al. | 267/140.14 |
| 5,492,312 | 2/1996 | Carlson | 267/140.14 |
| 5,848,678 | 12/1998 | Johnston et al. | 192/21.5 |
| 5,956,951 | 9/1999 | O'Callaghan | 60/326 |

FOREIGN PATENT DOCUMENTS

| | | |
|---|---|---|
| 0 230 626 A2 | 12/1986 | European Pat. Off. . |
| 59-017039 | 5/1984 | Japan . |
| 59-93578 | 5/1984 | Japan .................................... 137/909 |
| 85 862 | 11/1986 | Luxembourg . |
| 2 267 140 | 11/1993 | United Kingdom . |
| 2267947 | 12/1993 | United Kingdom . |
| WO 88/00299 | 1/1988 | WIPO . |
| WO 94 21938 | 9/1994 | WIPO . |
| WO 96/09203 | 3/1996 | WIPO . |
| WO 98 39578 | 9/1998 | WIPO . |

*Primary Examiner*—Douglas C. Butler
*Attorney, Agent, or Firm*—Randall S. Wayland

[57] ABSTRACT

An adjustable valve including a passageway, a field responsive fluid within the passageway, and flow adjustment of the fluid through the passageway. In another aspect, the valve is in a vibration damper. In yet another aspect, the damper includes a body, a piston, first and second chambers, a damping valve, a piston rod, an auxiliary chamber, a passageway interconnecting to the auxiliary chamber, a field responsive fluid, a field responsive fluid valve for controlling flow to the auxiliary chamber, and pressurization means. Preferably included is a cavity partition having field responsive fluid disposed on one side and non-field responsive fluid disposed on the other. This allows a reduction of MR fluid allowing use of lighter-weight, less-expensive, hydraulic fluids for flow through the piston's damping valve. In another aspect, the damper includes mechanical adjustment device for manually adjusting a damping level. Adjustment is accomplished by a moveable permanent magnet, moveable pole piece, moveable pole-and-magnet assembly, or magnetic shunt. Manual adjustment may include a knob, lever, or cable actuation. Alternately, magnetic flux is provided by an electromagnet. The valve and damper finds utility in any suspension system where a damper body is attached to a frame component, such as a bicycle frame, and the piston rod is attached to a suspension component, such as a bicycle's swingarm.

44 Claims, 11 Drawing Sheets

ADJUSTABLE VALVE AND VIBRATION DAMPER UTILIZING SAME

FIELD OF THE INVENTION

This invention relates to the area of vibration control devices. Specifically, the invention relates to devices utilizing field controllable materials for providing resistance forces.

BACKGROUND OF THE INVENTION

Controllable vibration devices include controllable linear dampers, mounts and the like whose damping may be controlled. In particular, field responsive fluid devices include any fluid whose apparent viscosity responds to an applied field (electrical or magnetic). One class of such field responsive fluids are MagnetoRheological (hereinafter MR) fluids, i.e., a mediums having magnetically-soft particles suspended in a carrier fluid. One such MR Fluid is described in commonly assigned U.S. Pat. No. 5,382,373 to Carlson et al. MR dampers are known and include linear acting varieties, i.e., those which include piston members which reciprocate in a damper body along a primary damper axis. In other words, linear-acting devices can be used for damping linear motion or for providing controllable dissipative forces.

For example, MR devices have been found useful in a wide variety of applications. MR dampers have been incorporated in vehicle engine mounts. One such device is taught in commonly assigned U.S. Pat. No. 5,398,917 to Carlson et al. Other MR fluid devices with electrical adjustment means are taught in the commonly assigned U.S. Pat. No. 5,277,281 entitled "Magnetorheological Fluid Dampers". U.S. Pat. No. 5,284,330 to Carlson et al. describes axially acting (linear) dampers and devices including sealless designs. Multi-Degree of freedom MR devices are described in U.S. Pat. No. 5,492,312 to Carlson entitled "Multi-Degree Of Freedom Magnetorheological Devices And System For Using Same.

A number of problems have emerged in developing viable controllable fluid dampers. First, the insertion of a valve within the piston of an MR damper as shown in FIGS. 9a–9d of U.S. Pat. No. 5,277,281, is generally complex and requires the electrical wire lead to be sealed. Further, having the controllable valve within the piston limits the space for the use of passive damping in conjunction with the controllable pathway. Therefore, a damper construction is needed which is cost effective and easy to manufacture. Also, in some instances, power may be unavailable, yet some damping adjustment may be desired. Therefore, a need exists for a device which is externally and mechanically adjustable by a user without the need for expensive electronic controls and electrical hardware. Additionally, the field responsive fluids tend to be costly, therefore there is a need for devices which utilize less fluid.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

Therefore, given the benefits and drawbacks of the prior art, the present invention is directed to an adjustable valve, comprising a passageway, a field responsive fluid (such as an MR fluid) within the passageway, and mechanical adjustment means for adjusting a flow of the field responsive fluid through the passageway. The adjustment means may include a permanent magnet moveable with respect to a pole piece, a moveable pole piece, a moveable magnet-and-pole assembly, or a shunt. Preferably, the mechanical adjustment means is hand operated and includes an adjustment knob or lever. Optionally, the mechanical adjustment means may be remotely cable actuated.

According to another aspect, a vibration damper is provided, comprising a damper body defining an internal cavity, a piston disposed within said internal cavity subdividing said cavity into first and second chambers, said passageway interconnecting to one of said first and second chambers, and the mechanical adjustment means provided for adjusting a damping level.

According to yet another aspect, a vibration damper is provided comprising a damper body defining an internal cavity, a piston disposed within the internal cavity and subdividing same into first and second operating chambers, a damping valve disposed within the piston, a piston rod secured to the piston and sealingly received into the internal cavity, an auxiliary chamber, a passageway interconnecting one of the first and second chambers to the auxiliary chamber, a field responsive fluid contained in the auxiliary cavity and at least one of the first and second chambers, a field responsive fluid valve for controlling flow of the field responsive fluid between the auxiliary cavity and at least one of the first and second chambers, and pressurization means for pressurizing said field responsive fluid. The field responsive fluid valve includes a moveable pole piece, moveable magnet, shunt, or an electromagnet for providing damping manually adjustable by a user.

In another aspect the damper includes a cavity partition within the internal cavity which is interactive with at least one of said first and second chambers, the cavity partition having a field responsive fluid disposed on one side and a non-field responsive fluid disposed on the other side thereof. This allows for a significant reduction in the amount of field responsive fluid needed. Lighter weight hydraulic fluids are used for flow through the damping valve(s) in piston.

In another aspect, the damper takes the form of a strut including a coil spring surrounding the damper body. The damper may include adjustment means for adjusting a position of the coil spring relative to the damper body to adjust ride height.

The damper finds excellent utility as part of a suspension system wherein the damper body is interconnected to a frame component, such as a bicycle frame, and said piston rod is interconnected to a moveable suspension component, such as a bicycle swingarm. Alternatively, the damper may be included as part of any suspension system, such as in an automobile or machine system.

It is an advantage of one aspect of the present invention that it provides for manual adjustment of the damper characteristics by the user.

It is an advantage of another aspect of the present invention that it provides for manual adjustment of the damper characteristics without requiring any electrical power.

It is an advantage of another aspect that it provides a damper having a short profile.

It is an advantage of another aspect that it provides a damper having lower weight than conventional MR dampers.

It is an advantage of another aspect that it provides a damper having a low cost externally adjustable valve.

It is an advantage of another aspect that it provides a damper exhibiting asymmetric damping with manual adjustment of the high and/or low states.

The abovementioned and further features, advantages, and characteristics of the present invention will become apparent from the accompanying descriptions of the preferred embodiments and attached drawings.

BRIEF DESCRIPTION OF THE DRAWINGS

The accompanying drawings which form a part of the specification, illustrate several embodiments of the present invention. The drawings and description together, serve to fully explain the invention. In the drawings.

DETAILED DESCRIPTION OF THE PREFERRED EMBODIMENTS

Figure 1:
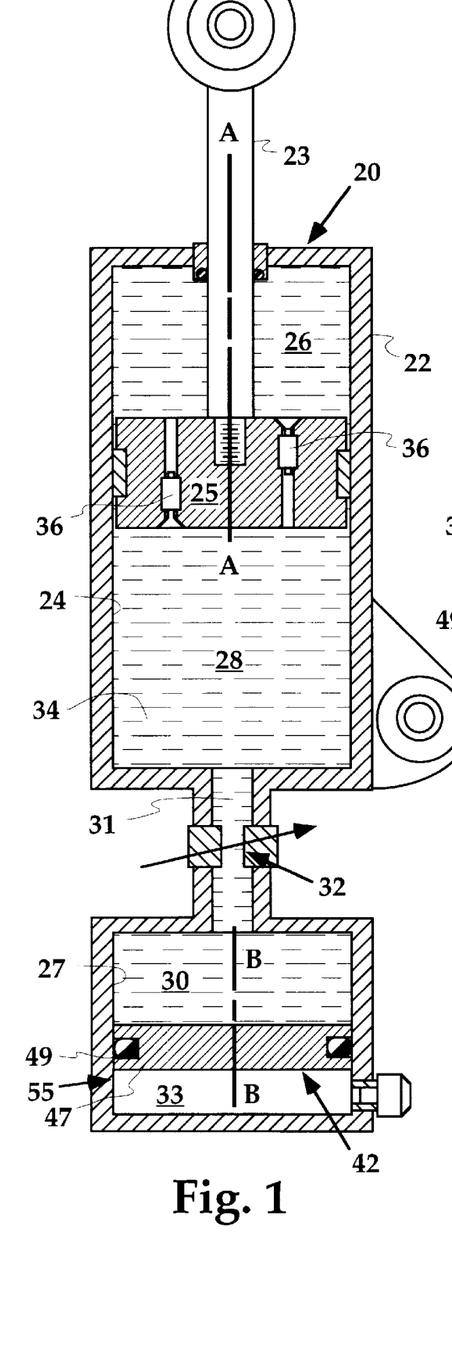
FIG. 1 is a partially cross-sectioned side view of a first embodiment of the field responsive fluid damper in accordance with the present invention.
Figure 2:
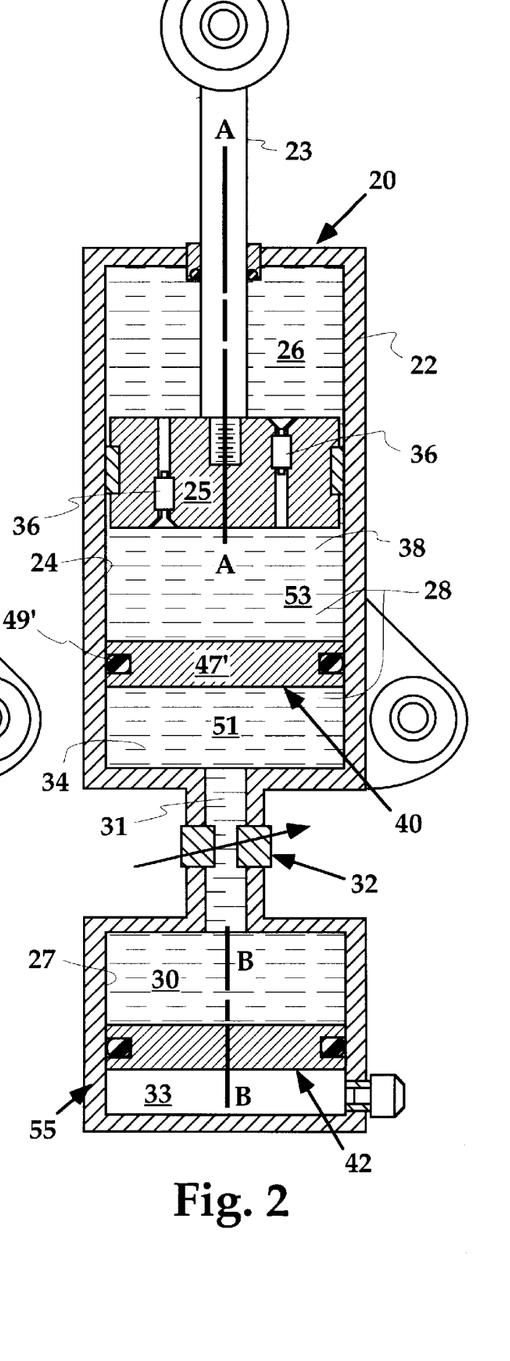
FIG. 2 is another partially cross-sectioned side view of another field responsive fluid damper.

With reference to the various figures herein, where like reference characters are employed where possible to indicate like parts, there is shown in FIGS. 1 and 2 a field responsive fluid damper including an adjustable valve 32, and more specifically, a magnetorheological (MR) fluid damper shown generally at 20. Damper 20 comprises a generally cylindrical damper body or housing 22 having an internal cavity 24. Body 22 has a central aperture that slidingly receives piston rod 23. Appropriate bearings and seals located in the end cap seal the interface between the piston rod 23 and the internal cavity 24 and prevent escape of fluid and carry side loads. The slideable piston 25 is secured to the piston rod 23 by a threaded portion, or the like, and is disposed within the internal cavity 24 subdividing the cavity 24 into first 26 and second 28 operating chambers. One or more damping valves 36 are disposed within the piston 25. The damping valve(s) 36 may take any of the known forms such as disc, reed, poppet, or ball valve, etc. The damping valve(s) 36 are used to shape the passive bound and rebound damping characteristics of the damper 20.

An auxiliary cavity 27 partially defines an auxiliary chamber 30 with a slideable partition 42 defining a moveable wall thereof. A flow passageway 31 interconnects one of the first 26 and second 28 chambers to the auxiliary chamber 30. A field responsive fluid 34, such as a MagnetoRheological (MR) fluid is contained in the auxiliary chamber 30 and at least one, and preferably both, of said first 26 and second 28 chambers. The control valve 32 controls flow of the field responsive fluid 34 between said auxiliary cavity 31 and at least one of said first 26 and second 28 chambers. Preferably, the passageway 31 directly exchanges fluid 34 with only one of the first 26 and second 28 chambers. An accumulator 55 provides presurization means for pressurizing the field responsive fluid 34 to prevent cavitation.

Preferably, the accumulator includes a puck-shaped partition 42 including a rigid nylon wall 47 having a periphery seal 49 located in, and slidable within, the auxiliary cavity 27. The partition 42 is disposed in contacting relationship with the field responsive fluid 34. Pressurized gas, such as nitrogen gas, contained within a gas chamber 33 provides the pressure needed to pressurize the field responsive fluid 34 within the damper 20.

As best seen in FIG. 2, the damper 20 may include a cavity partition 40 within the internal cavity 24. The cavity partition 40 is similar to the one earlier described, i.e., including a wall 47 and periphery seal 49'. The partition 40 is interactive with at least one of said first 26 and second 28 chambers, although it is shown partitioning the second chamber 28. As shown, the cavity partition 40 separates the second chamber into first and second subchambers 51, 53. The partition 40 includes the field responsive fluid 34, such as an MR fluid, disposed on one side, and a non-field responsive fluid 38, such as a standard hydraulic damper oil, disposed the other side thereof.

The non-field responsive fluid 38 passes back and forth through the damping valve(s) 36 located in the damper piston 25. The field responsive fluid valve 32 provides a magnetic flux to the field responsive fluid 34. Preferably, that flux is variable and may be accomplished in a number of ways.

Figures 3, 4, 5, 6:
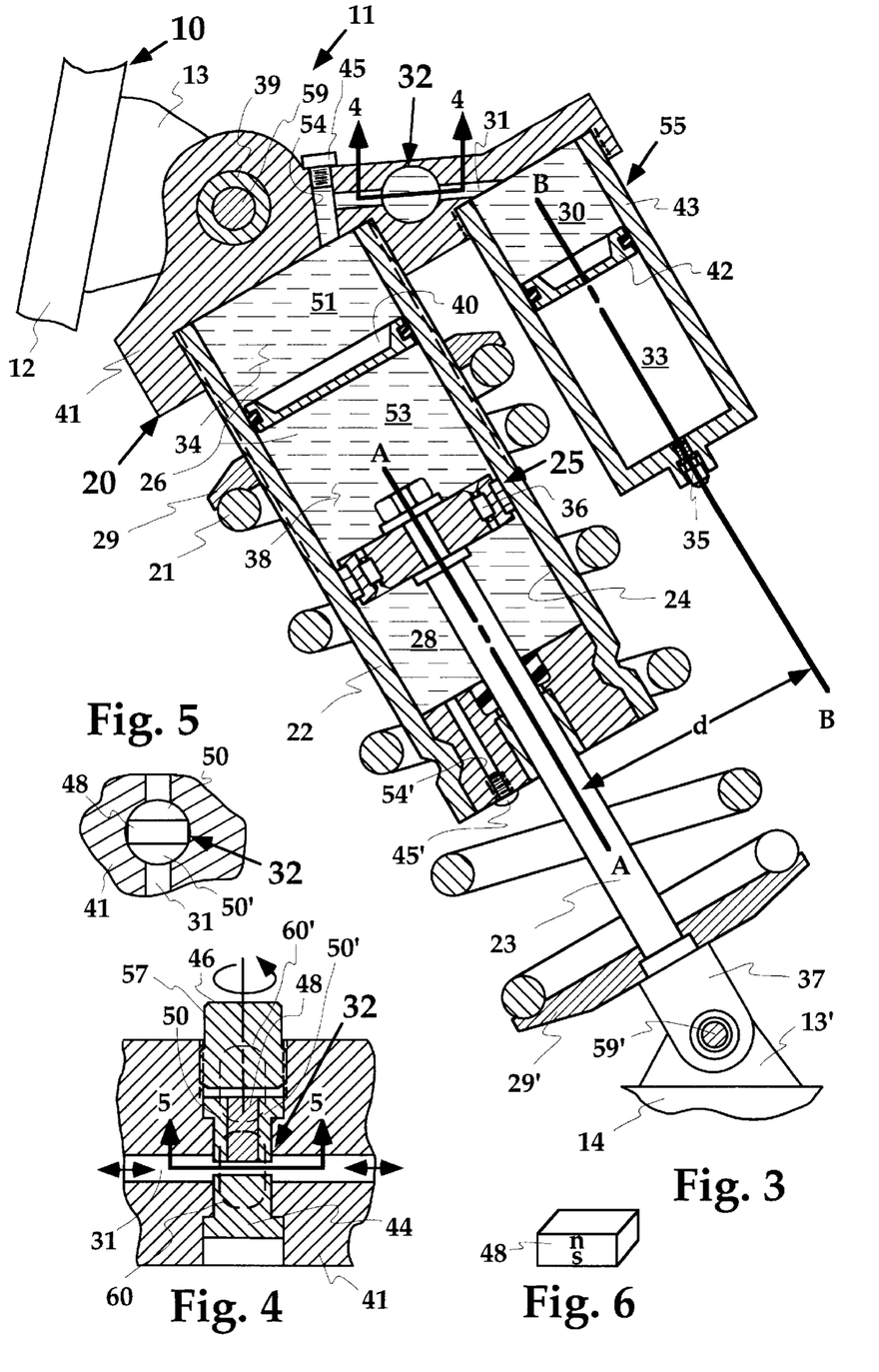
FIG. 3 is a damper in accordance with the present invention installed as part of a suspension.
FIG. 4 is a partial cross-sectioned end view of a field responsive valve assembly of FIG. 3.
FIG. 5 is an end view of the magnet-and-pole assembly of FIG. 4.
FIG. 6 is a perspective view of the permanent magnet of FIG. 4.
Figure 7:
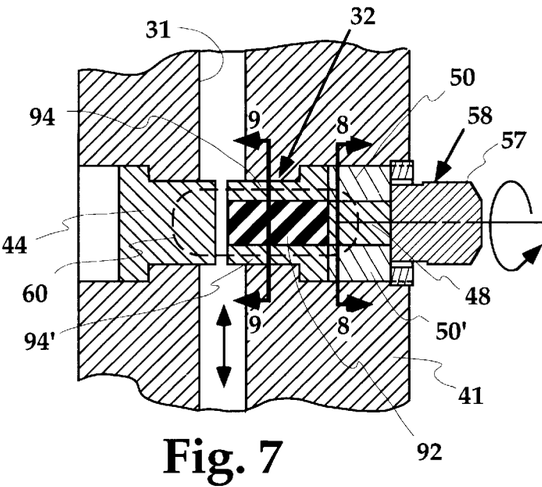
FIG. 7 is a cross-sectioned end view of an alternate adjustable valve assembly.
Figures 13, 14:
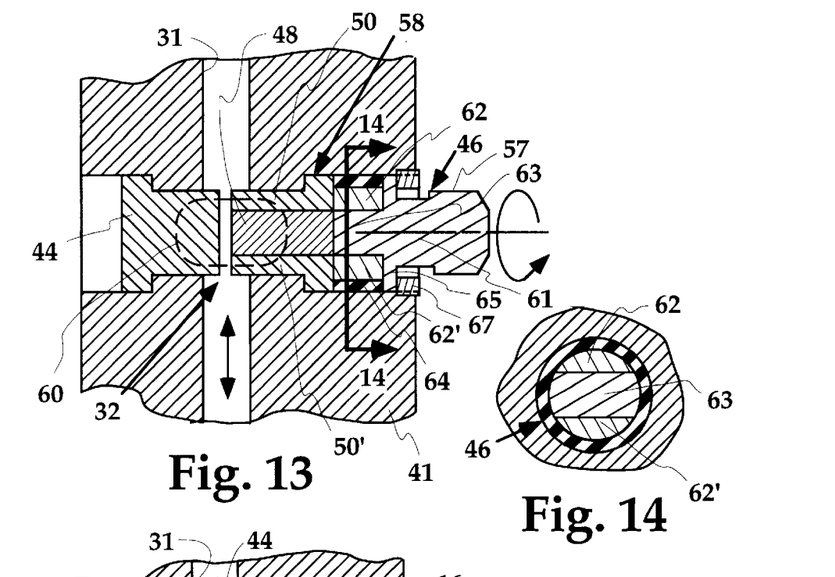
FIG. 13 is a cross-sectioned end view of an alternative adjustable valve assembly.
FIG. 14 is a cross-sectioned end view of the shunt mechanism of FIG. 13 along line 14—14.
Figure 15:
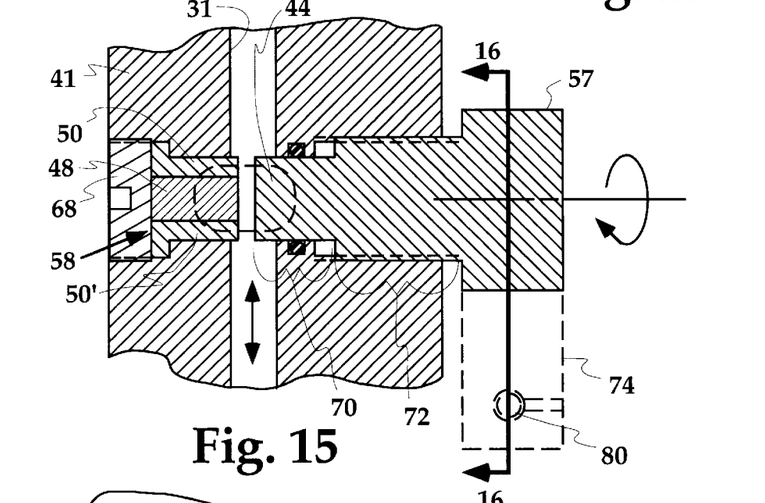
FIG. 15 is a cross-sectioned end view of an alternative adjustable valve assembly.
Figure 16:
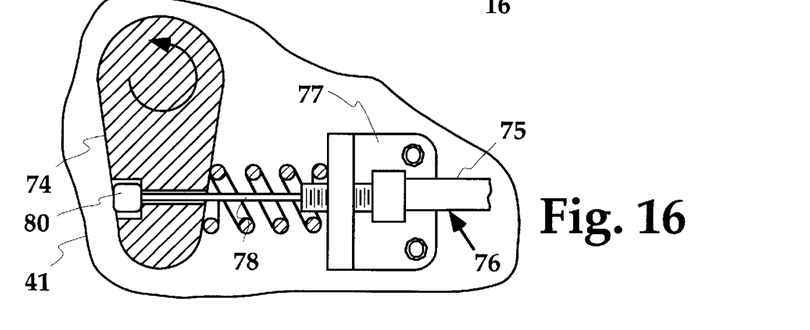
FIG. 16 is a side view of a cable actuation mechanism for actuating the optional lever shown in FIG. 15.
Figure 17:
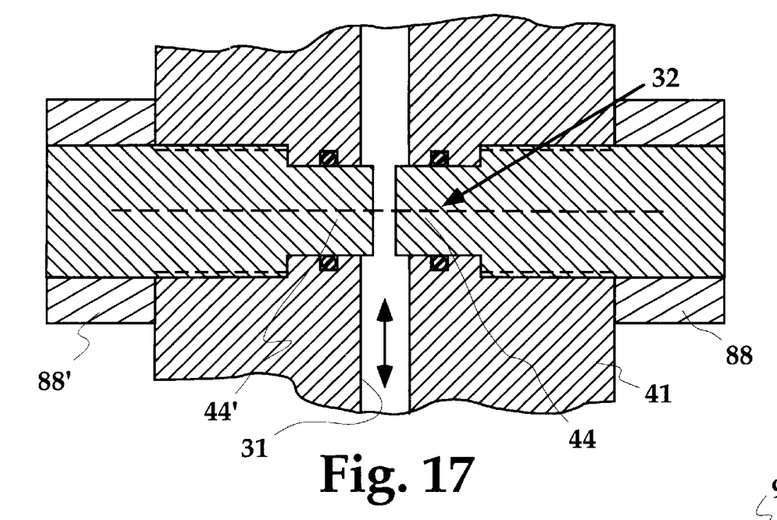
FIG. 17 is a cross-sectioned end view of an alternative electromagnetic adjustable valve assembly.
Figure 18:
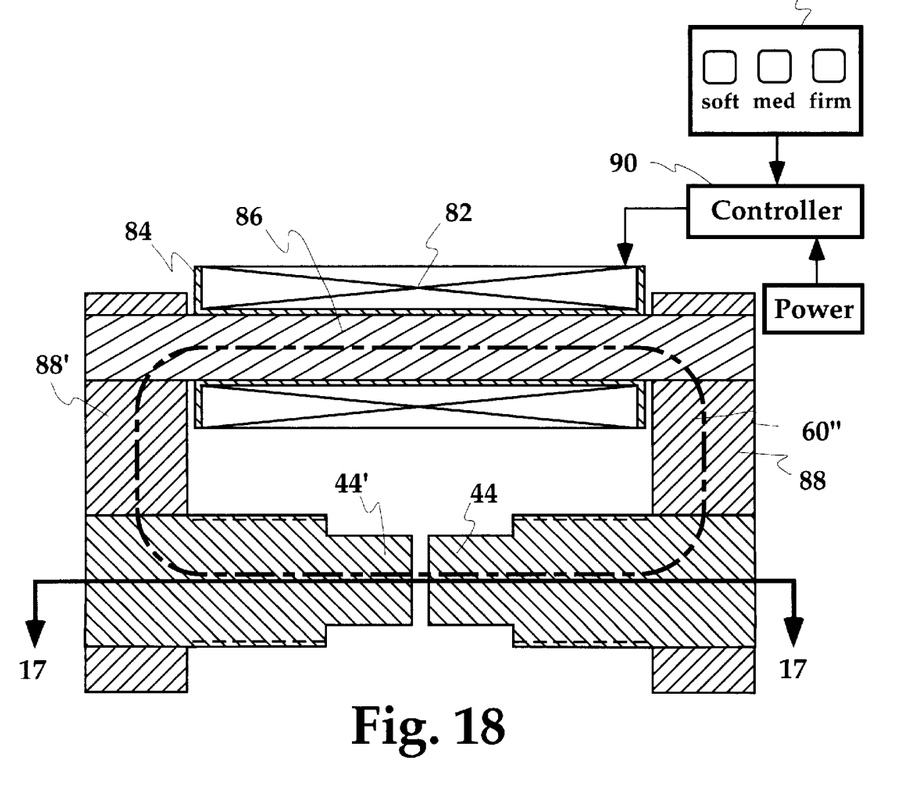
FIG. 18 is a cross-sectioned side view of the electromagnetic valve assembly of FIG. 17 with the nonmagnetic end removed for clarity.

As shown in FIG. 7 the variable flux may be accomplished by moveable permanent magnet. Alternately, the variable flux may be accomplished by a moveable pole piece (FIG. 15) or a moveable shunt (FIGS. 4 and 13). The position adjustment of the magnet, pole piece, or shunt is preferably accomplished by user operated mechanical adjustment means, such as a knurled knob (FIGS. 4, 13, or 15) or a lever (FIGS. 15, 16). Alternately, the lever may be actuated remotely by a user via cable actuation as shown in FIG. 16. If power is available, the variable flux may be provided by an electromagnet (electrical means) as shown in FIGS. 17 and 18.

FIG. 3 illustrates the damper 20 in accordance with the present invention installed as part of a suspension assembly 11 of a bicycle 10. The bicycle 10 includes a frame component 12, and a pivotable suspension swingarm 14. The damper body 22 includes means for interconnecting to a frame component 12 (ex. the vertically extending tube frame shown) such as nonmagnetic end 41 attached to clevis bracket 13 (only half shown) by bolt 59. The bolt 59 is received in bushing 39 formed in nonmagnetic end 41. The piston rod 23 includes means for interconnecting to the suspension swingarm component 14 such as rod end 37 attached to bracket 13' by bolt 59'. Rod end 37 may include a pin or spherical joint to allow rotation and/or pivotal motion. Optionally, a coil spring 21 may surround the body 22 and provide an assisting spring force, i.e., additional load carrying capability and flexibility in the suspension system 11 over and above that provided by the compensator 55.

The coil assembly preferably includes adjustment means for adjusting a position of the coil spring 21 relative to said body 22. For example, a threaded retainer 29 is threadedly received over the outer threaded surface of the damper body 22. Appropriate threading of the retainer 29 accomplishes changes in ride height. A stationary retainer 29' abuts the rod end 37.

The field responsive fluid 34 is preferably retained between the axially moveable partitions 40 and 42 formed in the auxiliary chamber 30 and chamber 26. In response to deflections or vibrations of the piston 25 within the cavity 24, fluid 34 passes through the field responsive fluid valve 32. A non-field responsive fluid 38 is used as the primary working fluid in chamber 28 and subchamber 53 to accomplish damping via passing the non-field responsive fluid 38 through the damping valves 36 formed in piston 25. Preferably, the piston 25 subdivides cavity 24 into first and second chambers 26, 28 and includes disc, poppet, reed, ball or other like valves (spring loaded poppet valves shown) for controlling passive bound and rebound damping levels. Bolts or other like fastening means secure the piston 25 to the shaft 23.

Partition 40 subdivides chamber 26 into subchambers 51, 53 the first 51 including field responsive fluid 34 and the second 53 including non-field responsive fluid 38. The second operating chamber 28 and second subchamber 53 are filled with non-field responsive fluid via fill hole 54 and sealed via fill plug 45'. Similarly, the auxiliary chamber 30, passageway 31, adjustable valve 32, and first subchamber 51 are filled with field responsive fluid 34 via fill hole 54 and sealed via fill plug 45. The gas chamber 33 in accumulator 55 is filled with nitrogen gas via fill valve 35 to the appropriate level, and thus may provide a spring force for supporting weight between the frame 12 and swingarm 14. The partition 42 within accumulator 55 separates the field responsive fluid 34 in auxiliary chamber 30 from the gas in gas chamber 33 and is slidably received in the accumulator body 43. The auxiliary chamber 30 preferably includes a central axis B—B which is parallel to, and preferably is offset a distance d from, the damper axis A—A.

FIGS. 4 and 5 illustrates a first embodiment of manually adjustable controllable valve 32. The valve 32 is received in the web portion of nonmagnetic end 41 of the damper of FIG. 3 and controls flow between the subchamber 51 and the auxiliary chamber 30. Similar valves may be incorporated in FIGS. 1 and 2 where the arrow traversing the valve 32 indicates that its damping values may be appropriately adjusted. Again referring to FIGS. 4 and 5, the valve includes a stationary soft magnetic pole piece 44 secured in the end 41, and a stationary permanent (squarish shaped) magnet 48 as shown in FIG. 6 having north n and south s poles. Magnets, such as neodynium iron boron, or the like, are preferred. Pole pieces 50, 50' are spaced on either side of the magnet 48. Appropriate sealing compound is used to seal the gaps between the magnet 48, poles 50, 50', and nonmagnetic end 41. The magnet 48 produces a magnetic field (indicated by flux lines 60 shown) which cross the passageway 31 and cause a rheology change in the field responsive fluid flowing therethrough, thereby changing damping. A soft-magnetic shunt 46 is threadedly received adjacent to the pole pieces 50, 50'. As the shunt 46 is threaded inward, it provides a secondary field path within the shunt 46 for the magnetic flux to travel within (indicated by 60'). The closer the shunt 46 comes to the proximity of the pole pieces 50, 50' the weaker the primary flux path 60 becomes, i.e., the field strength is weakened. Therefore, as the shunt 46 is turned further in, damping rate of the damper 20 is decreased. The further out the shunt 46 is threaded, the stronger the magnetic flux in the primary path 60 becomes, thus the higher damping rate that can be achieved. The damping level may easily be adjusted by the user grasping and turning a knob portion 57 formed on the shunt 46. It should be understood that a wide range of damping adjustment is provided.

Figure 8:
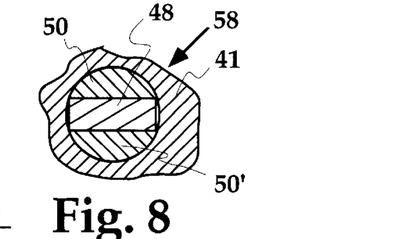
FIG. 8 is a cross-sectioned end view of the moveable magnet-and-pole assembly of FIG. 7 along line 8—8.

FIG. 7 illustrates an alternate embodiment of adjustable valve 32 in accordance with the present invention which could be used in place of the valve described in FIG. 4. In this valve 32, the mechanical adjustment means includes a moveable permanent magnet 48 within a moveable magnet-and-pole assembly 58. The assembly 58 is manually rotatable by the user to position the magnet 48 such that the poles 50, 50' are aligned with the stationary soft-magnetic intermediate poles 94, 94'. Magnetic insulator 92, such as plastic or rubber, ensures that the flux lines 60 cross the passageway 31 and return through the stationary pole 44. An end view of the magnet-and-pole assembly 58 can best be seen in FIG. 8. An end view of the intermediate pole assembly including stationary poles 94, 94' and insulator 92 sealingly received in nonmagnetic end 41 can be seen in FIG. 9. Rotation of knob 57 90° from the position shown in FIG. 7 will disrupt the magnetic circuit 60 in that poles 50, 50' will extend across intermediate poles 94, 94' passing through intermediate poles 94, 94' and cause the damping level to be low, while alignment of the poles 50, 50' with intermediate poles 94, 94' will cause damping to be high as a large portion of the flux will cross the passageway 31.

Figure 9:
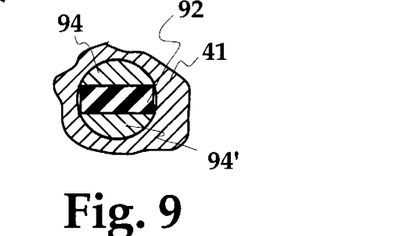
FIG. 9 is a cross-sectioned end view of the intermediate pole assembly of FIG. 7 along line 9—9.
Figure 10:
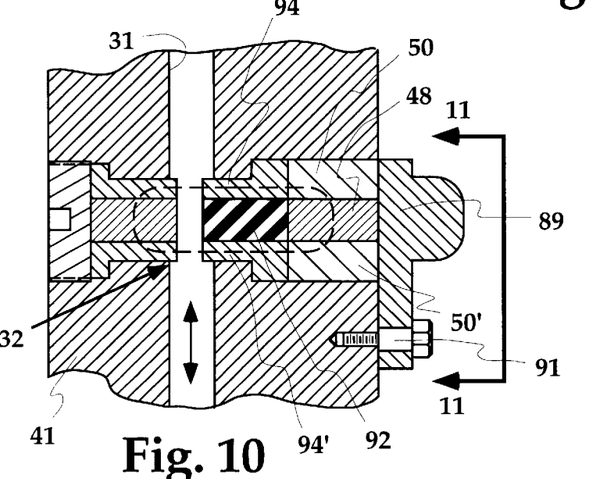
FIG. 10 is a cross-sectioned end view of the an alternate adjustable valve assembly.
Figure 11:
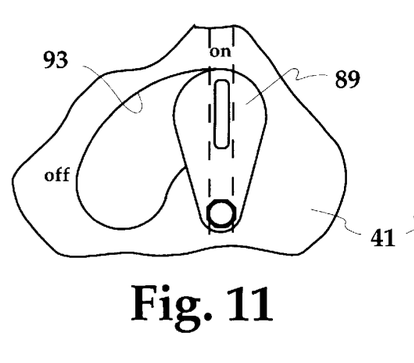
FIG. 11 is a side view of the valve of FIG. 10 along line 11—11, shown positioned in the on (high damped) position.
Figure 12:
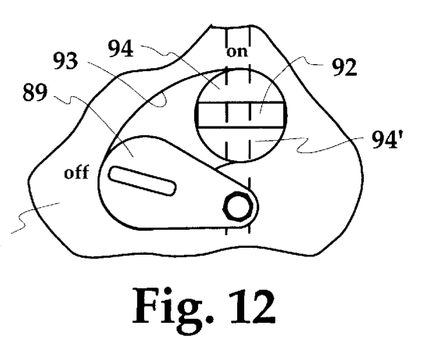
FIG. 12 is a side view of the valve of FIG. 10 shown in the off (low damped) position.

FIG. 10 illustrates another alternate embodiment of valve 32 including a moveable permanent magnet 48 as the mechanical adjustment means. This valve 32 could also readily be exchanged for the valve shown in FIG. 4. Poles 50, 50' and magnet 48 are rigidly attached to nonmagnetic pivotable arm 89 which is pivotable about fastener 91 when manually grasped by the user. When positioned as shown in FIG. 11, the poles 50, 50' are aligned with the intermediate poles 94, 94' and the flux across the passageway 31 is maximized causing high damping. Conversely, when the pivot arm 89 is rotated within slot 93 and positioned as shown in FIG. 12, the flux acting across the passageway 31 is eliminated, thus providing a low damping state. The intermediate pole assembly is the same as shown in FIG. 9 having an insulator 92 of rubber or plastic and soft-magnetic intermediate poles 94, 94' sealingly secured in nonmagnetic end 41.

FIG. 13 illustrates an alternate embodiment of adjustable valve 32 providing the mechanical hand-operated adjustment means. This valve 32 fits into the body 41 in the same place as previously described and includes a stationary pole piece 44, a stationary magnet-and-pole assembly 58 including a magnet 48, and poles 50, 50', and a rotational magnetic shunt 46. The rotational shunt 46 rotates in response to the user adjusting the knurled knob 57. The shunt 46 includes a nonmagnetic post 61 including a knob 57 on one end and a flattened pilot 63 on the other. Arranged on either side of the pilot 63 are soft-magnetic shunt halves 62, 62'. The halves 62, 62' are retained in place by nonmagnetic retainer 64 made of plastic or rubber. Jam ring 65 is loosely snugged against the protruding shelf 67 to secure the magnetic shunt 46 in place, yet allow relatively free rotation. Properly sizing the outer nonmagnetic retainer 64 will provide some rotational restraint.

Rotational positioning of the magnetic shunt 46, as shown in FIG. 13, will align the halves 62, 62' with the pole pieces 50, 50' thus providing a high damped state. Rotation by 90° therefrom will cause the shunt halves 62, 62' to short across the poles 50, 50', thus effectively disrupting the magnetic circuit 60 thereby reducing the flux density exposed to the passageway 31. This reduces the damping in damper 20 to a low state. Various intermediate damping states are provided by various intermediate positionings of shunt 46.

FIG. 15 illustrates another alternate embodiment of adjustable valve 32. This valve 32 is positioned in the end 41 as previously described and includes a stationary magnet-and-pole assembly 58 including a stationary permanent magnet 48 and pole pieces 50, 50' held in place by nonmagnetic threaded cap 68 and appropriate sealant, and a moveable pole piece 44. The pole piece 44 includes a sealed pilot portion 70, a threaded portion 72, and a knob 57. An o-ring seal retained in a groove formed in the nonmagnetic end 41 seals against the pilot portion 72.

Rotation of the pole piece 44 about its axis as shown moves the pilot portion 70 closer to the magnet-and-pole assembly 58. This has the effect of reducing the cross-sectional area of the passageway 31 and also increases the field strength acting across the passageway 31. These have the concomitant result of increasing damping. If enough axial throw of the pole 44 can be achieved, the damper 20 may be locked up. It should be understood that the damper 20 including the valve 32 in accordance with the present invention has the advantage that a yield stress, once exceeded, will allow flow through the passageway 31. In this way, the valve 32 provides temporary locking mechanism, in that the damper 20 will lock up until a finite load is achieved, then, once exceeded, flow will be enabled through the passageway 31. Prior art mechanical valves can completely lock flow, undesirably enabling extremely large pressures to be built up in the damper upon receiving large load inputs.

Also in FIG. 15 and more clearly in FIG. 16 is shown an alternate configuration (shown dotted in FIG. 15) where a lever 72 extends from the pole 44. The lever 72 may be actuated by hand directly, or remotely by using cable actuation. As shown in FIG. 16, a cable 76 including a strand 78, a sheath 75 and an end 80 is attached to the lever 72. Upon being remotely actuated by the user, bracket 77 attached to end 41 restrains sheath 75 and allows movement of the strand 78 within sheath 75, thus causing rotation the lever 72. Rotation of the lever 72 adjusts the level of damping provided within the damper. This type of actuation is equally applicable with the other valves shown in FIGS. 4, 7, 10, and 13.

FIGS. 17 and 18 illustrate an electromagnet embodiment of valve 32 where the means for adjustment is provided by electrical means. The valve 32 includes poles 44, 44' which are threaded into the nonmagnetic end 41 in the same position as the previously described mechanically adjustable valves. A coil 82 is circumferentially wound on a nonmagnetic bobbin 84 and surrounds the soft magnetic rod-shaped core 86. The ends of core 86 and poles 44, 44' are interconnected by soft-magnetic links 88, 88' which are pressed thereon to complete the magnetic circuit shown as dotted lines 60". The coil 82 is interconnected to a controller 90 which supplies the appropriate current thereto. The selected current is preferably supplied by a user manually adjusting an appropriate level of current (from high to low) via an input pad 92, adjustable variance, or the like. Increasing the current supplied to the coil 82 increase the field strength of the field exposed to the passageway 31, thus increasing damping.

Figure 19:
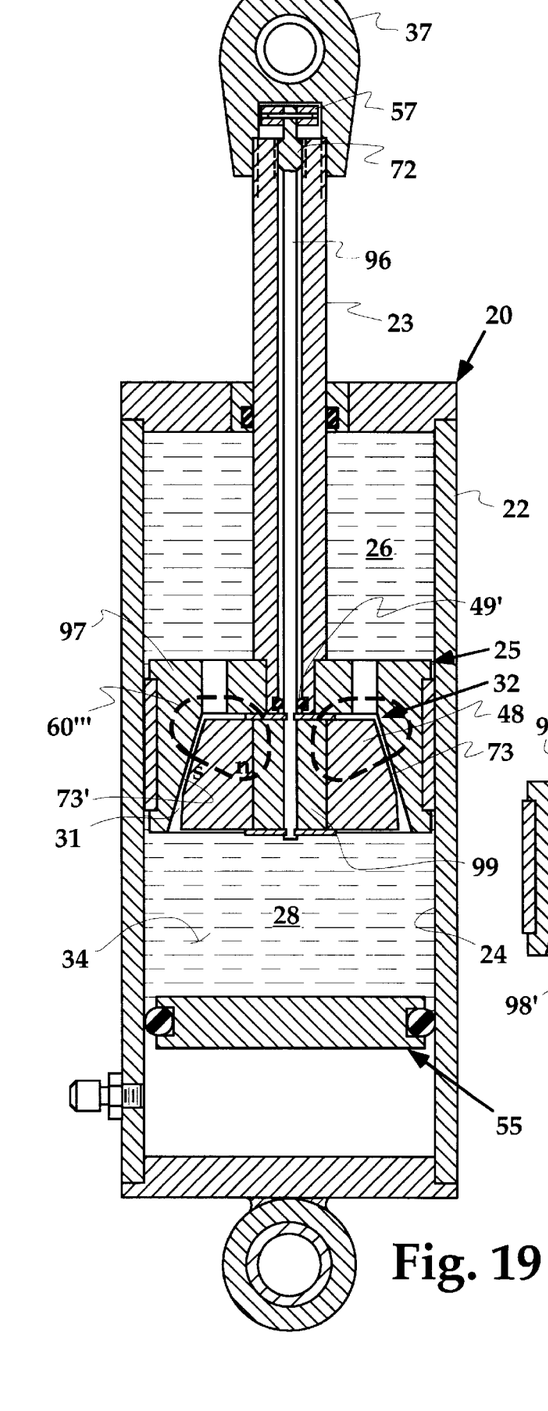
FIG. 19 is a cross-sectioned side view of another manually adjustable damper in accordance with the present invention.

FIG. 19 illustrates a damper 20 including the adjustable valve 32 in accordance with another aspect of the present invention. The damper 20 which includes a damper body 22 defining an internal cavity 24, a piston 25 disposed within and subdividing the cavity 24 into first 26 and second 28 chambers, a passageway 31 interconnecting to one of said first and second chambers 26, 28, and preferably connecting between the first and second chambers 26, 28, a field responsive fluid 34 contained within the passageway 31 and preferably also contained in the first and second chambers 26, 28, and hand-operated mechanical adjustment means for manually adjusting a damping level in the damper 20.

In this embodiment, the adjustment means comprises an adjustment rod 96 including a threaded portion 72 interconnected to the adjustment valve 32 mounted in the piston 25. The rod 96 extends axially through the piston rod 23 and is rotated by the user via a rigidly secured knurled knob 57. The knob 57 is received in lateral cross-slot formed through rod end 37. Rotating rod 96 moves a nominal axial position of a permanent magnet 48 in valve 32. The magnet 48 includes a conical surface 73 which interacts with a like conical surface 73' formed on the soft magnetic piston body 97 to form passageway 31. The magnet 48 is formed such that it includes north n and south s poles that are radially oriented as shown, thus creating a flux path as shown by dotted lines 60''' which returns through the soft-magnetic piston body 97. The damper 20 includes an accumulator 55 for accommodating the volume of the piston rod 23 and thermal expansion. Also, pressurizing of the gas chamber provides an appreciable spring force.

In operation, rotating the adjustment rod 96 axially moves a core 99 which is preferably secured to magnet 48, and thus, adjusts the thickness of the gap between the magnet 48 and the return body 97 and, thus, the flux density acting upon the passageway 31. The wider the gap, the less damping that is provided. Conversely, the narrower the gap, the higher the damping. When the gap is completely closed or very nearly closed, virtually no flow through the passageway 31 is allowed, providing a desirable lockup feature of the damper 20. A seal 49' formed at the bottom of rod 96 prevents escape of field responsive fluid 34 into the rod 23.

Figure 20:
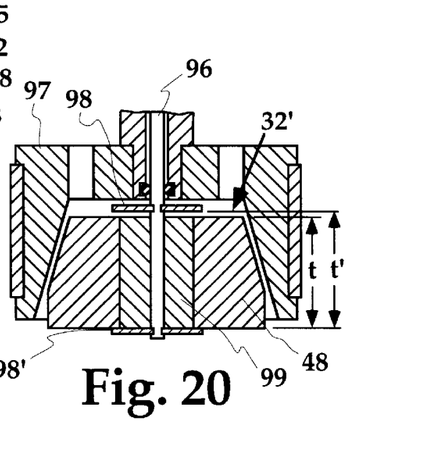
FIG. 20 is a cross-sectioned side view of an alternate damper valve providing asymmetric damping.

FIG. 20 represents an alternate embodiment of valve 32' which may replace the valve shown in FIG. 19. C-clips 98 on rod 96 are spaced slightly wider than the axial thickness t of the magnet 48, such that the magnet 48 and core 99 may slide in an axial direction by a short distance in response to extension and compression flows. This sliding action provides asymmetric damping. For example, the extension damping rate is predetermined by the position of lower c-clip 98' on adjustment rod 98 and the nominal position of the magnet 48 relative to return 97. The compression rate is determined by the position of the upper c-clip 98 and the nominal position of the magnet 48 relative to return 97. The wider the spacing t' is in comparison to the magnet thickness t, the greater the difference will be between the compression and extension damping rates. The highest and lowest rates are adjustable by axially moving the rod 96 with attached clips 98, 98' secured thereon.

Figure 21:
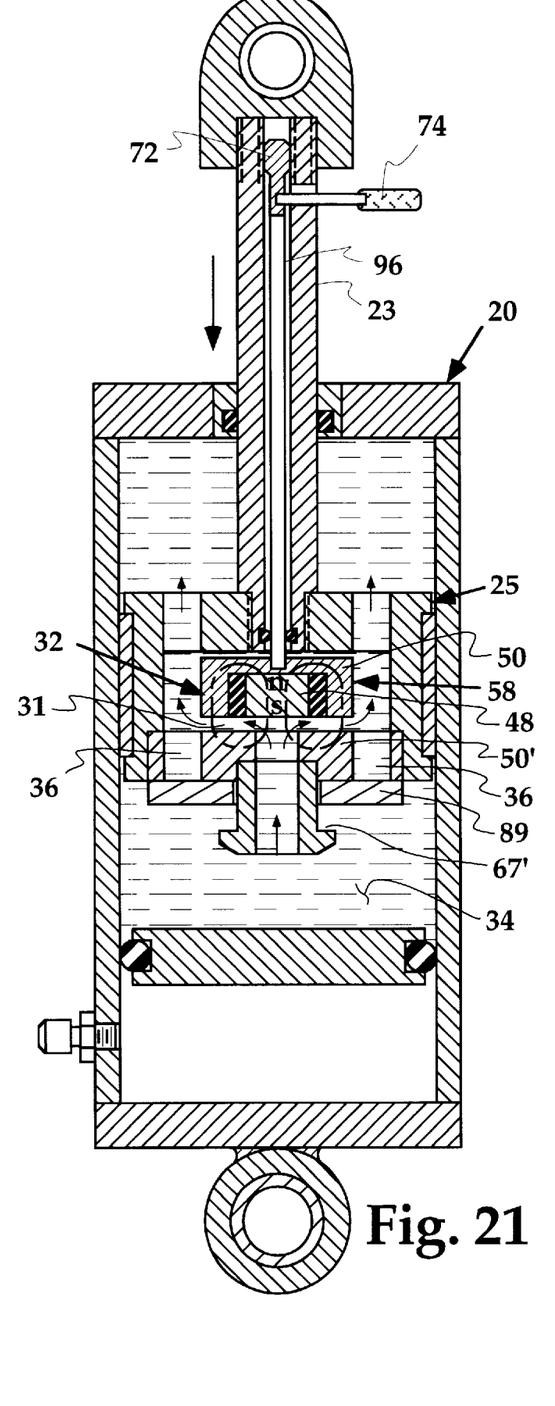
FIG. 21 is a cross-sectioned side view of another damper configuration in accordance with the present invention.
Figure 23:
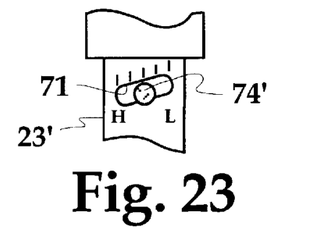
FIG. 23 is a side view of an alternate manual damping adjustment.

FIG. 21 illustrates another valve 32 and damper 20 according to the present invention which includes a manually adjustable magnet-and-pole assembly 58 mounted within the piston 25. The magnet 48 is a puck-shaped permanent magnet and the upper pole 50 is a inverted cup-shaped soft magnetic member. A user rotating the adjustment lever 74 about the axis of the piston rod 23 rotates the adjustment rod 96, which advances or retracts threaded portion 72 within like threads formed in rod 23, thus causing the magnet-and-pole assembly 58 to move axially within the piston 25 relative to lower pole 50'. This adjusts the thickness of the gap in the passageway 31, which changes the circuit reluctance, thus increasing or decreasing the damping. Alternately, the adjustment mechanism in FIG. 23 could be implemented, thereby eliminating the need for the threaded section 72. Damping would be adjusted by moving lever 74' within angled slot 71 formed in rod 23', thus moving the pole-and-magnet assembly 58 axially.

Figure 22:
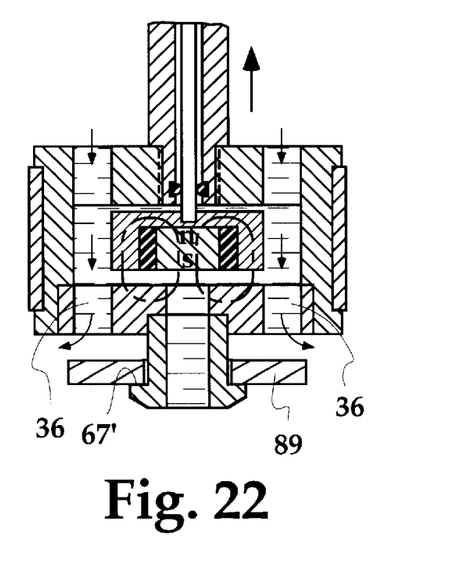
FIG. 22 is a cross-sectioned side view of the damper valve of FIG. 21 shown during the extension stroke.

In accordance with another aspect, the damping valve 32 includes asymmetric damping rates in compression and extension. During the compression stroke, as shown in FIG. 21, floating disc 89 contacts seat on piston 25 and closes off multiple spaced extension passages 36 (preferably 4), forcing the field responsive fluid 34 to flow entirely through the passageway 31. In extension, as shown in FIG. 22, the floating disc 89 seats on shelf 67' and the vast majority of flow is through extension passageways 36, thus providing a different lower rate in extension than in compression.

Figure 24:
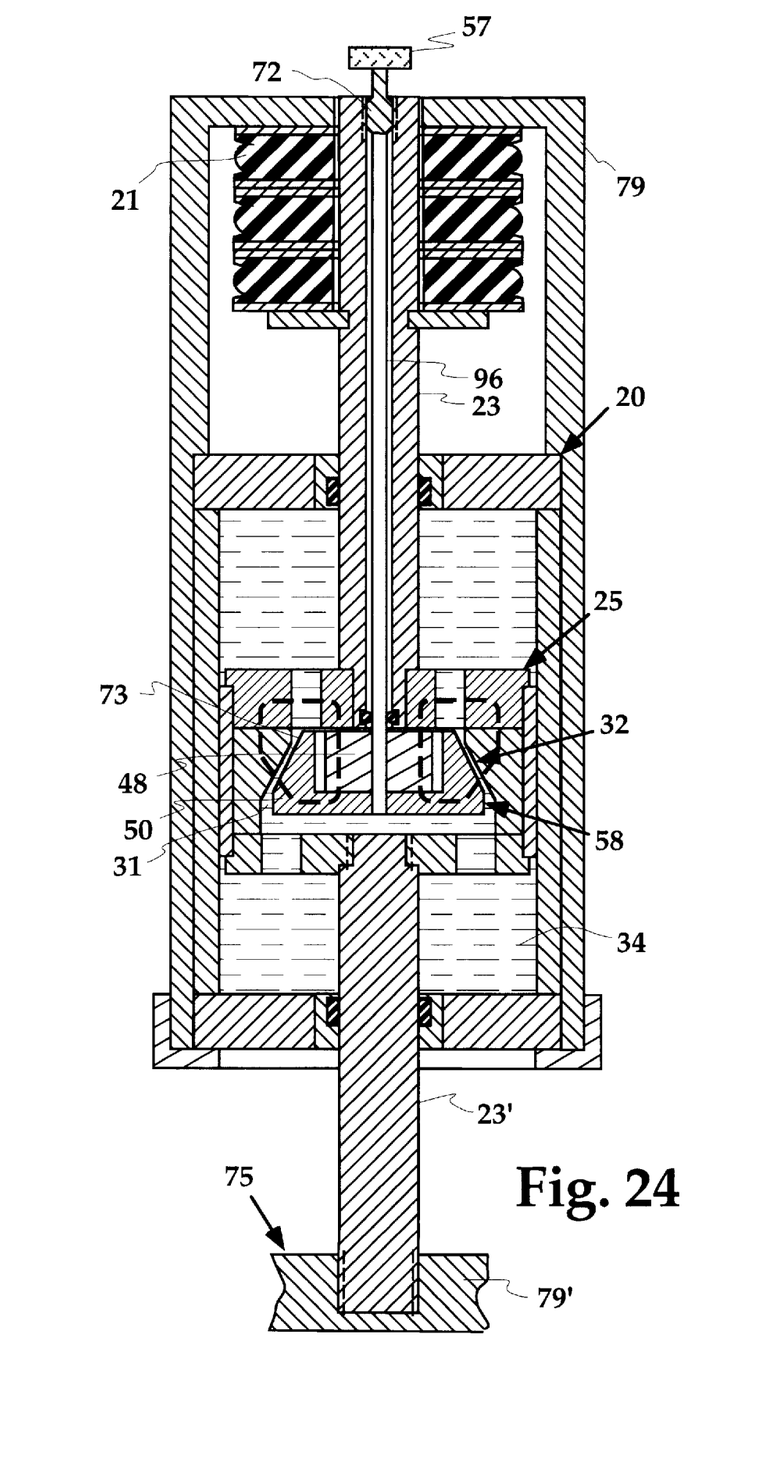
FIG. 24 is a cross-sectioned side view of another damper configuration in accordance with the present invention including dual piston rods.

FIG. 24 illustrates yet another adjustable valve 32 and damper 20 according to the present invention. This damper 20 includes first and second piston rods 23, 23' secured to respective ends of piston 25. The hand-operated adjustable valve 32 provided the mechanical adjustment means and includes a conical surface 73 formed on the pole 50 of a moveable magnet-and-pole assembly 58 including magnet 48 and pole 50. Adjusting the position of the magnet-and-pole assembly 58 is accomplished by rotating threaded section 72 of adjustment rod 96 extending through upper piston rod 23 by way of knob 57. This changes the gap in the passageway 31, thus changing the magnetic reluctance and bringing about a rheology change in the field responsive fluid 34 thereby changing damping. This type of double piston rod damper 20 is useful, for example, in a fork assembly 75 of a bicycle and allows the rider to adjust the damping level. The upper rod 23 is slidably received in the upper fork portion 79 which is received in the front upright of the bicycle frame. A lower fork portion 79' attaches to the bicycle wheel hub. This damper 20 would generally be used in parallel spring relation with a coil or elastomer spring 21.

Figure 25:
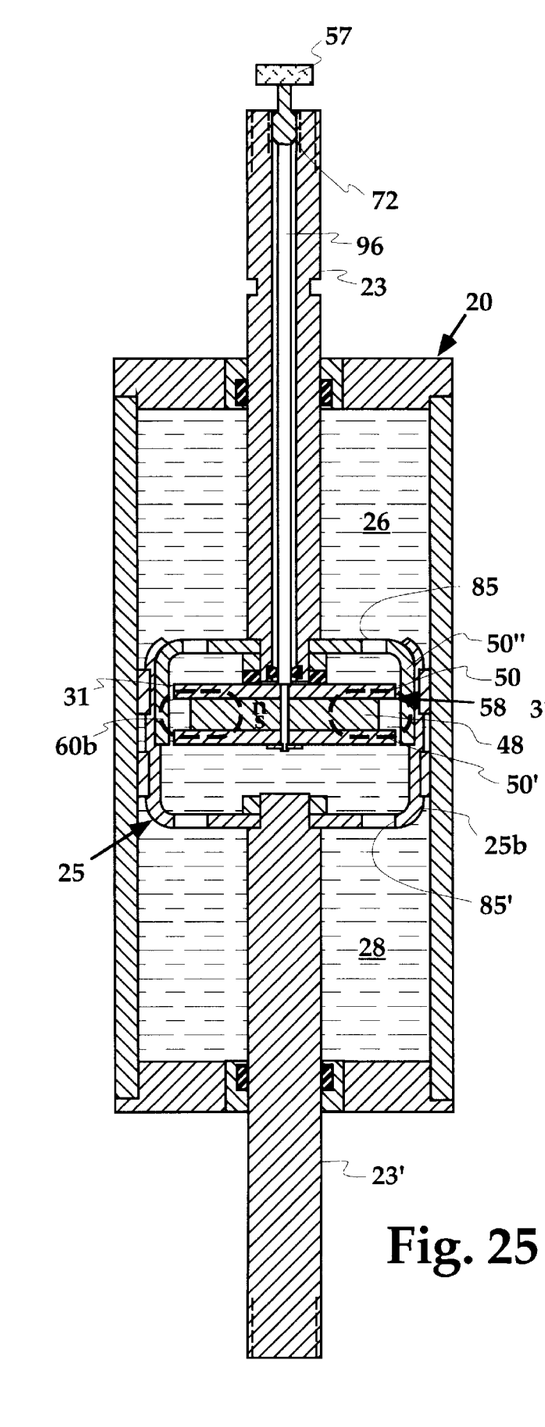
FIG. 25 is a cross-sectioned side view of another damper and damper valve configuration in accordance with the present invention with the valve shown fully retracted.

FIG. 25 illustrates an alternate embodiment of valve 32 and damper 20. The damper 20 again includes a piston 25 and dual piston rods 23, 23'. In this embodiment, the mechanical adjustment means is comprised of a moveable pole-and-magnet assembly 58. The assembly 58 includes a permanent ring magnet 48 sandwiched between disc-shaped soft magnetic poles 50, 50'. The assembly 58 is mounted on the adjustment rod 96 which includes threaded portion 72 at its upper end. As in the other embodiments, rotating threaded rod 96 via knob 57 advances or retracts assembly 58 within outer soft magnetic cup-shaped pole 50". The pole 50" has a similar structure in the embodiments following in FIGS. 27–36.

Figure 26:
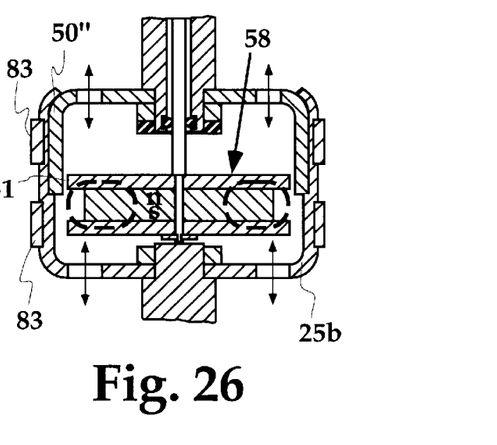
FIG. 26 is a cross-sectioned side view of the adjustable valve assembly of FIG. 25 shown fully extended.

As shown retracted in FIG. 25, the magnetic flux 60b jumps across the annular passageway 31 as indicated by dotted lines and is carried in outer annular pole 50". Shown fully advanced in FIG. 26, the circuit reluctance is increased significantly. Thus, little flux crosses the passageway 31 providing a low damping state. Piston 25 is constructed of an upper cup-shaped, soft-magnetic pole piece 50" and a lower half 25b of nonmagnetic material which is secured around the pole 50". Sealing rings 83 are secure around the periphery of piston 25. Flow into and out of the cavities 26, 28 is through the plurality of spaced entryways 85, 85' positioned radially around rods 23, 23' at multiple increments (4 or more per end).

Figure 27:
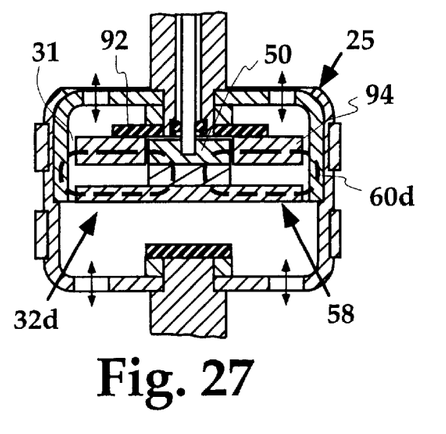
FIG. 27 is a cross-sectioned side view of an alternate valve assembly shown in a fully retracted state.
Figure 28:
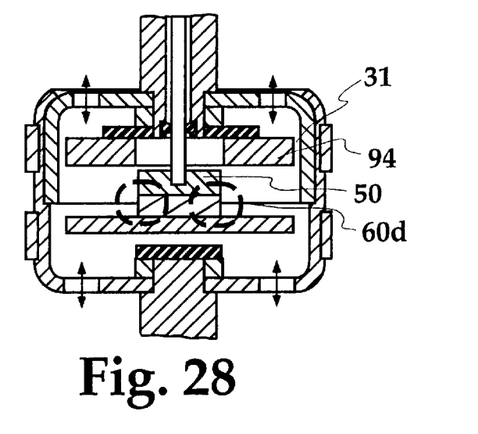
FIG. 28 is a cross-sectioned side view of the valve assembly of FIG. 27 shown in a fully extended state.

FIG. 27 illustrates an alternate embodiment of mechanically adjustable valve 32d useful in a damper of the type shown in FIGS. 21 or 25. This embodiment includes a moveable magnet-and-pole assembly 58 integral within the piston 25. It differs from the previous embodiment in that the top pole piece 50 is axially moveable relative to a stationary annular intermediate pole piece 94 secured to an insulator 92 of nonmagnetic material. When the pole-and-magnet assembly 58 is traversed axially downward as shown in FIG. 28, the top pole 50 is no longer aligned with the intermediate pole 94 and the magnetic circuit (illustrated by dotted lines 60*d*) is interrupted and, thus, damping is reduced because little or no flux passes across the passageway 31. Contrarily, when the magnet-and-pole assembly is positioned as shown in FIG. 27, maximum damping is achieved as the flux 60*d* acts across the annular passageway 31 which changes the rheology of the field responsive fluid therein. It should be recognized that there are a continuum of intermediate damping positions.

Figure 29:
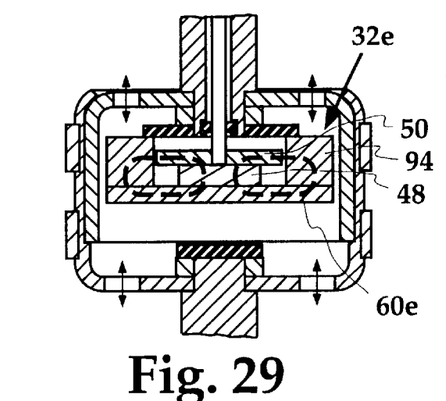
FIG. 29 is a cross-sectioned side view of an alternate valve assembly shown in a fully retracted state.
Figure 30:
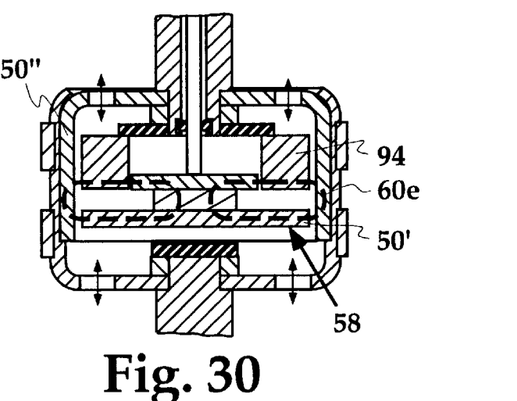
FIG. 30 is a cross-sectioned side view of the valve assembly of FIG. 24 shown in a fully extended state.

FIGS. 29 and 30 illustrate another embodiment of mechanically adjustable valve 32*e*. In this embodiment, the top pole piece 50 is disc-shaped and has a diameter that is larger than the diameter of the puck-shaped magnet 48. In the position shown (fully retracted), the damping is minimal as the intermediate pole 94 functions as a magnetic shunt, in that little or no flux 60*e* acts across the passageway 31. Shown with the magnetand-pole assembly 58 in an extended position in FIG. 30, the magnetic circuit generated by magnet 48 passes across the annular passageway 31 as is indicated by dotted lines 60*e*, is carried in the outer pole 50", and finally returns through lower pole 50'. This provides a high damping state.

Figure 31:
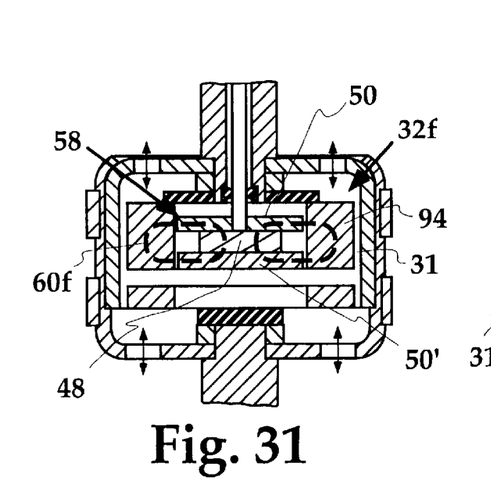
FIG. 31 is a cross-sectioned side view of an alternate valve assembly shown in a fully retracted state.
Figure 32:
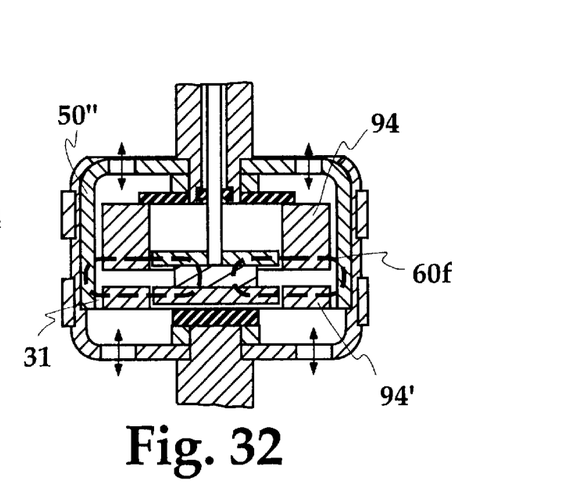
FIG. 32 is a cross-sectioned side view of the valve assembly of FIG. 31 shown in a fully extended state.

FIGS. 31 and 32 illustrate another embodiment of mechanically adjustable valve 32*f*. In this embodiment, shown in the retracted position in FIG. 31, the magnet 48, top pole piece 50, bottom pole piece 50' making up magnet-and-pole assembly 58 create and direct the field into the annular soft magnetic intermediate 94 pole. This shunts the field 60*f* thereby minimizing the field exposed to the annular passageway 31. Shown extended in FIG. 32 the magnet-and-pole assembly 58 aligns with, and directs the field 60*f* into, the intermediate poles 94, 94' and through the outer annular pole 50", thus crossing the passageway 31. This extended state provides high damping.

Figure 33:
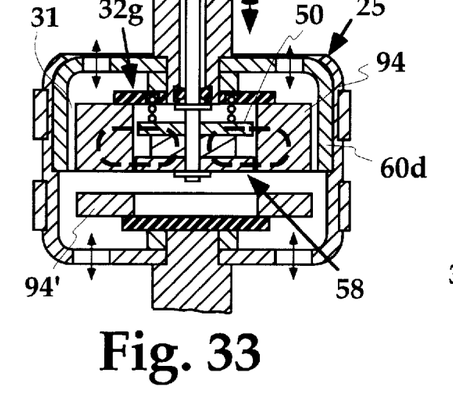
FIG. 33 is a cross-sectioned side view of an alternate valve assembly shown in a fully retracted state.
Figure 34:
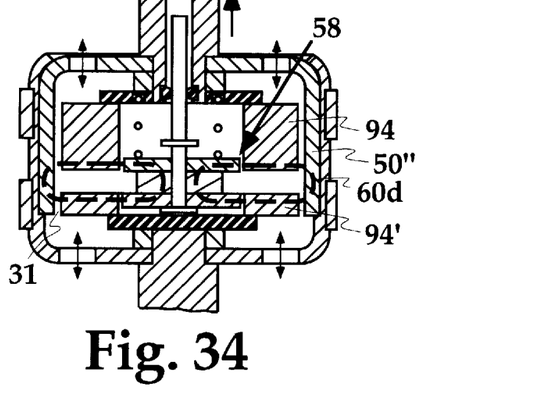
FIG. 34 is a cross-sectioned side view of the valve assembly of FIG. 33 shown in a fully extended state during a extension stroke.
Figure 35:
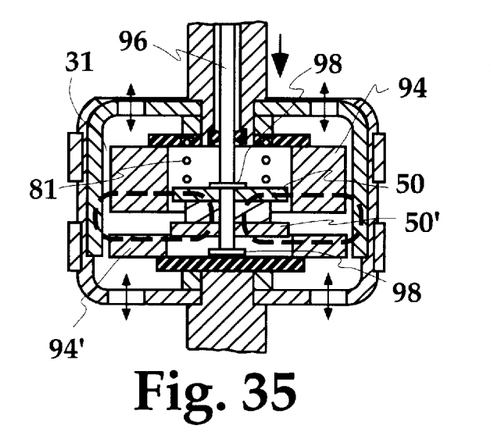
FIG. 35 is a cross-sectioned side view of the valve assembly of FIG. 33 shown in a fully extended state during a compression stroke.

FIGS. 33–35 illustrate another embodiment of mechanically adjustable valve 32*g* within the piston 25 of a damper. Shown in the retracted position in FIG. 33, the pole-and-magnet assembly 58 is aligned with the intermediate pole 94, thus shunting the field 60*d*. No field is carried in lower stationary annular intermediate pole 94'. This positioning provides a low damped state for both extension and compression strokes. In FIG. 34, shown fully extended during the extension stroke, the circuit 60*d* through upper 94, lower 94' and outer 50" annular poles is completed by alignment of the poles 50, 50' of pole-and-magnet assembly 58 with upper and lower intermediate poles 94, 94', thus causing flux to be carried across the annular passageway 31. This provides a high damped condition during the extension stroke.

As seen in FIG. 35 a somewhat lower damping state during the compression stroke is provided by the pole-and-magnet assembly 58 which is axially slideable between limits provided by c-clips 98, 98' secured on the adjustment rod 96. Coil spring 81 keeps the pole-and-magnet assembly 58 normally biased toward the lower c-clip 98' and prevents movement until a predetermined pressure differential is achieved. During the compression stroke, as shown, the poles 50, 50' no longer exactly align with the intermediate poles 94, 94', thus providing lower damping. It should be understood that asymmetric damping, i.e., different rates in each of the compression and extension strokes is provided in a continuum of intermediate positions, as well.

Figure 36:
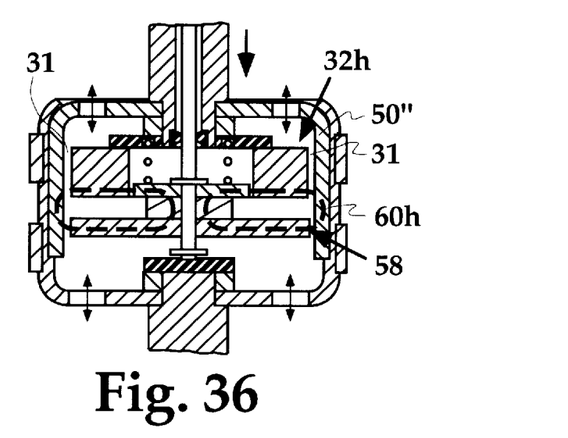
FIG. 36 is a cross-sectioned side view of an alternate valve assembly shown in a fully extended state during a compression stroke.
Figure 37:
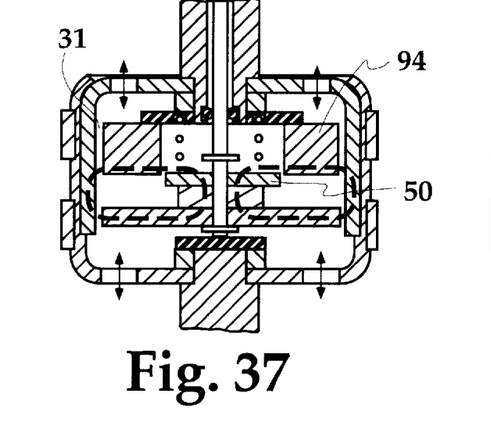
FIG. 37 is a cross-sectioned side view of the valve assembly of FIG. 36 shown in a fully extended state during an extension stroke.
Figure 38:
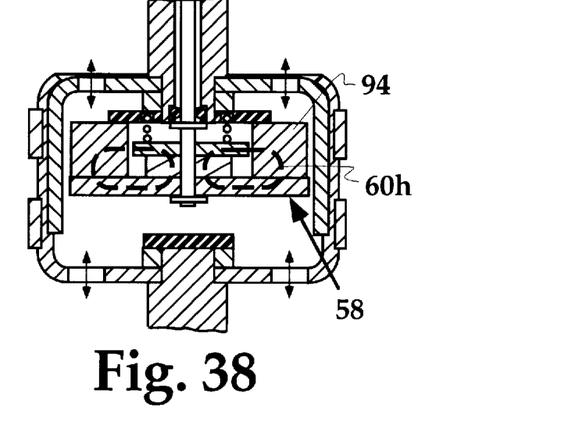
FIG. 38 is a cross-sectioned side view of the valve assembly of FIG. 36 shown in a fully retracted state.

FIGS. 36–38 illustrate a final embodiment of mechanically adjustable valve 32*h* providing the mechanical adjustment means. Shown extended and during the compression stroke in FIG. 36, is the magnet-and-pole assembly 58 providing flux 60*h* which crosses the annular passageway 31 and returns through the outer pole 50". Shown in FIG. 37 in extension, and retracted, a weaker flux is provided because of the misalignment of pole 50 with pole 94, thus providing a lower damping force in extension. As shown in FIG. 38 in the fully retracted position, the magnet-and-pole assembly 58 produces the field 60*h* which is shunted by intermediate pole 94, thus providing a lowest damped state.

While the preferred embodiments of the present invention have been described in detail, various modifications, alterations, changes and adaptations to the aforementioned may be made without departing from the scope of the present invention defined in the appended claims. It is intended that all such modifications, alterations and changes be considered part of the present invention.

What is claimed is:

1. An adjustable valve, comprising:
    (a) a passageway;
    (b) a field responsive fluid within said passageway, said field responsive having rheological properties that substantially change in response to an applied field; and
    (c) mechanical adjustment means for adjusting a flow of said field responsive fluid through said passageway by changing the rheological properties of the field responsive fluid, said mechanical adjustment means including at least one magnet.

2. The adjustable valve of claim 1 wherein said at least one magnet includes a permanent magnet moveable with respect to a pole piece.

3. The adjustable valve of claim 2 wherein said permanent magnet includes a conical surface defining a portion of said passageway.

4. The adjustable valve of claim 1 wherein said mechanical adjustment means includes a moveable pole piece.

5. The adjustable valve of claim 1 wherein said mechanical adjustment means includes a moveable magnet-and-pole assembly.

6. The adjustable valve of claim 1 wherein said mechanical adjustment means includes a magnetic shunt.

7. The adjustable valve of claim 1 wherein said mechanical adjustment means is hand operated.

8. A damper including the adjustable valve of claim 1, comprising:
    (a) a damper body defining an internal cavity,
    (b) a piston disposed within said internal cavity subdividing said cavity into first and second chambers,
    (c) said passageway interconnecting to one of said first and second chambers, and
    (d) said mechanical adjustment means provided for adjusting a damping level of said damper.

9. The damper including the adjustable valve of claim 8 further comprising:
    (a) a partition disposed in said second chamber further subdividing said second chamber into first and second subchambers,
    (b) a non-field responsive fluid disposed in said first operating chamber and said second subchamber,
    (c) a damping valve disposed within said piston,
    (d) a piston rod secured to said piston and sealingly received into said internal cavity,
    (e) an auxiliary chamber,
    (f) said passageway interconnecting said first subchamber to said auxiliary chamber, (g) a field responsive fluid in said auxiliary chamber and said first subchamber, (h) said valve controlling flow of said field responsive fluid between said auxiliary chamber and said first subchamber, and (i) pressurization means for pressurizing said field responsive fluid.

10. The damper including the adjustable valve of claim 8 further comprising:

(a) a damping valve disposed within said piston, (b) a piston rod secured to said piston and sealingly received into said internal cavity, (c) an auxiliary cavity partially defining an auxiliary chamber, (d) said passageway interconnecting one of said first and second chambers to said auxiliary chamber, (e) a field responsive fluid contained in said auxiliary chamber and at least one of said first and second chambers, (f) said mechanical adjustment means controlling flow of said field responsive fluid between said auxiliary cavity and at least one of said first and second chambers, and (g) pressurization means for pressurizing said field responsive fluid.

11. The damper of claim 10 wherein said pressurization means further comprises a partition located within said auxiliary cavity which is disposed in contacting relationship with said field responsive fluid and is acted upon by a pressurized gas contained within a gas chamber.

12. The damper of claim 10 further comprising a cavity partition within said internal cavity and interactive with at least one of said first and second chambers, said cavity partition having said field responsive fluid disposed on one side and a non-field responsive fluid disposed on another side thereof.

13. The damper of claim 12 wherein said partition includes a rigid wall member having an external radial periphery and a seal formed around said external radial periphery.

14. The damper of claim 10 wherein said field responsive fluid valve provides a magnetic flux to said field responsive fluid.

15. The damper of claim 14 wherein said magnetic flux is variable.

16. The damper of claim 15 further including a moveable permanent magnet.

17. The damper of claim 15 further including a moveable pole piece.

18. The damper of claim 15 further including hand operated adjustment means.

19. The damper of claim 18 further including a knob.

20. The damper of claim 18 further including a lever.

21. The damper of claim 18 further including cable actuation.

22. The damper of claim 18 further including a magnetic shunt.

23. The damper of claim 10 further including a coil spring surrounding said body.

24. The damper of claim 10 further including adjustment means for adjusting a position of said coil spring relative to said body.

25. A suspension system including a damper of claim 10 wherein said damper body includes attachment means for interconnecting to a frame component and said piston rod includes attachment means for interconnecting to a moveable suspension component.

26. The damper of claim 10 wherein said auxiliary chamber includes a central axis (B—B) which is parallel to a damper axis (A—A).

27. The damper of claim 26 wherein said central axis (B—B) which is offset a distance (d) from said damper axis (A—A).

28. A vibration damper, comprising:

(a) a damper body defining an internal cavity, (b) a piston disposed within said internal cavity subdividing said cavity into first and second operating chambers, (c) a damping valve disposed on said piston, (d) a piston rod secured to said piston and sealingly received into said internal cavity, (e) an auxiliary chamber, (f) a passageway interconnecting one of said first and second (28) chambers to said auxiliary chamber, (g) a field responsive fluid contained in said auxiliary chamber and at least one of said first and second chambers, (h) a control valve for controlling flow of said field responsive fluid between said auxiliary cavity and at least one of said first and second chambers, and (i) pressurization means for pressurizing said field responsive fluid.

29. A controllable vibration damper, comprising:

(a) a damper body defining an internal cavity, (b) a piston disposed within said internal cavity subdividing said cavity into first and second operating chambers, (c) a damping valve disposed within said piston, (d) a piston rod secured to said piston and sealingly received into said internal cavity, (e) an auxiliary chamber, (f) a passageway interconnecting one of said first and second chambers to said auxiliary chamber, (g) a field responsive fluid contained in said auxiliary chamber and at least one of said first and second chambers, (h) a hand-operated adjustment valve for controlling flow of said field responsive fluid between said auxiliary chamber and at least one of said first and second chambers.

30. A controllable vibration damper, comprising:

(a) a damper body defining an internal cavity, (b) a piston disposed within said internal cavity subdividing said cavity into first and second operating chambers, (c) a damping valve disposed within said piston, (d) a piston rod secured to said piston and sealingly received into said internal cavity, (e) a coil spring surrounding said damper body and interconnected to said piston rod, (f) an auxiliary chamber, (g) a passageway interconnecting one of said first and second (28) chambers to said auxiliary chamber, (h) a field responsive fluid contained in said auxiliary chamber and at least one of said first and second chambers, (i) an adjustable valve for controlling flow of said field responsive fluid between said auxiliary chamber and at least one of said first and second chambers, and (j) pressurization means for pressurizing said field responsive fluid.

31. A controllable vibration damper, comprising:

(a) a damper body defining an internal cavity, (b) a piston disposed within said internal cavity subdividing said cavity into first and second chambers, (f) a partition disposed in said second chamber further subdividing said second chamber into first and second subchambers, (c) a non-field responsive fluid disposed in said first operating chamber and said second subchamber, (d) a damping valve disposed within said piston, (e) a piston rod secured to said piston and sealingly received into said internal cavity, (g) an auxiliary chamber, (h) a passageway interconnecting said first subchamber to said auxiliary chamber, (i) a field responsive fluid in said auxiliary and said first subchamber, (h) a controllable valve controlling flow of said field responsive fluid between said auxiliary and said first subchamber, and (i) presurization means for pressurizing said field responsive fluid.

32. A vibration damper, comprising:

(a) a damper body defining an internal cavity, (b) a piston subdividing said internal cavity into first and second chambers, (c) a passageway interconnecting between said first and second chambers, (d) a field responsive fluid in said passageway, and (e) mechanical adjustment means for manually adjusting a damping level of said damper by controlling flow of said field responsive fluid through said passageway.

33. The damper of claim 32 wherein said mechanical adjustment means includes a permanent magnet moveable with respect to a stationary pole piece.

34. The damper of claim 33 wherein said moveable permanent magnet includes a conical surface defining a wall portion of said passageway.

35. The damper of claim 32 wherein said mechanical adjustment means includes comprises a moveable pole piece.

36. The damper of claim 32 wherein said mechanical adjustment means includes a magnetic shunt.

37. The damper of claim 32 wherein said mechanical adjustment means includes a moveable magnet-and-pole assembly.

38. The damper of claim 32 further comprising means for providing asymmetric damping.

39. The damper of claim 32 wherein said mechanical adjustment means includes an adjustment rod mounted for rotation within a piston rod secured to said piston.

40. The damper of claim 39 wherein said adjustment rod includes a threaded portion on an upper end and a seal at a lower end thereof.

41. The damper of claim 39 wherein said adjustment rod includes a knob or lever secured to said upper end thereof.

42. The damper of claim 32 further comprising spring for biasing a pole-and-magnet assembly.

43. A vibration damper, comprising:

(a) a damper body defining an internal cavity, (b) a piston subdividing the internal cavity into first and second chambers, (c) a passageway interconnecting to at least one of the first and second chambers, (d) a field responsive fluid in the passageway, and (e) an adjuster including hand actuation which manually adjusts a level of flux acting upon the field responsive fluid thereby adjusting a damping level by controlling flow of the field responsive fluid through the passageway and changing a rheology of the fluid.

44. An adjustable valve, comprising:

(a) a passageway, (b) a field responsive fluid within the passageway, and (e) an adjuster including hand actuation which manually adjusts a level of flux acting upon the field responsive fluid thereby controlling flow of the field responsive fluid through the passageway and changing a rheology of the fluid.

* * * * *